(12) United States Patent
Desabhatla

(10) Patent No.: US 11,139,764 B2
(45) Date of Patent: Oct. 5, 2021

(54) GENERATOR STABILIZATION

(71) Applicant: General Electric Company, Schenectady, NY (US)

(72) Inventor: Sreedhar Desabhatla, Garching Bei München (DE)

(73) Assignee: General Electric Company, Schenectady, NY (US)

(*) Notice: Subject to any disclaimer, the term of this patent is extended or adjusted under 35 U.S.C. 154(b) by 384 days.

(21) Appl. No.: 15/403,773

(22) Filed: Jan. 11, 2017

(65) Prior Publication Data

US 2018/0198394 A1  Jul. 12, 2018

(51) Int. Cl.
*H02P 9/10* (2006.01)

(52) U.S. Cl.
CPC .............. *H02P 9/105* (2013.01); *H02P 9/102* (2013.01)

(58) Field of Classification Search
CPC ................................. H02P 9/105; H02P 9/102
USPC ......................................................... 700/292
See application file for complete search history.

(56) References Cited

U.S. PATENT DOCUMENTS

| 2010/0049455 | A1* | 2/2010 | Scholtz | H02P 9/105 702/60 |
| 2012/0075893 | A1* | 3/2012 | Higuchi | H02M 1/32 363/37 |
| 2012/0200166 | A1* | 8/2012 | Berggren | H02J 3/24 307/102 |
| 2015/0200615 | A1 | 7/2015 | Desabhatla et al. | |
| 2015/0377057 | A1 | 12/2015 | Desabhatla | |

OTHER PUBLICATIONS

M. Baechle, V. Knazkins and D. Stutz, "On some aspects of power system stabilizer blocking logic," 2011 IEEE Power and Energy Society General Meeting, San Diego, CA, 2011, pp. 1-6.

* cited by examiner

*Primary Examiner* — Chun Cao
(74) *Attorney, Agent, or Firm* — Fletcher Yoder P.C.

(57) ABSTRACT

A system includes an excitation system. The excitation system includes a memory that may store an adaptive power system stabilizer (PSS) system that may dynamically stabilize an operation of a generator system. The excitation system also includes a processor communicatively coupled to the memory that may selectively utilize the adaptive PSS system based upon a determination of whether one or more operational parameters of the generator system has met or exceeded a threshold value.

18 Claims, 3 Drawing Sheets

GENERATOR STABILIZATION

BACKGROUND

The subject matter disclosed herein relates to power generating systems, and more specifically, to the adaptive control of power generating systems.

Certain systems such as generators and distributed generator may include voltage regulators to perform various monitoring and control operations, such as magnetic field excitation and regulation. Excitation controllers may receive various feedback signals to provide control flexibility, but most generally include voltage and current feedback signals to regulate and control the output of, for example, generators, turbines, motors, or other similar synchronous machines of, for example, a power generating system. The control functions may include the control of voltage, reactive power flow, and the overall stability of the power system. However, under certain operating conditions, the generating system may become unstable to the point that a conventional excitation controller and/or conventional power system stabilizer (CPSS) may dampen oscillations, but may not be as effective as desired in dampening the rotor oscillations. Specifically, the conventional excitation controller and/or CPSS may not dampen the rotor oscillations in such a manner that may produce desirable output and performance.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

A system includes an excitation system, that includes a memory to store an adaptive power system stabilizer (PSS) system to dynamically stabilize an operation of a generator system, and a processor communicatively coupled to the memory and to selectively utilize the adaptive PSS system based upon a determination of whether one or more operational parameters of the generator system has met or exceeded a threshold value.

A non-transitory computer-readable medium having computer executable code stored thereon, the code comprising instructions to dynamically stabilize an operation of a generator system via selectively utilizing an adaptive PSS system based upon a determination of whether one or more operational parameters of the generator system has met or exceeded a threshold value.

A system includes an excitation system to regulate one or more outputs of a power generating system including a memory configured to store an adaptive power system stabilizer (PSS) system to dynamically stabilize an operation of the power generating system an input to receive an indication of a measured value of an operational parameter affecting the generator system, and a processor communicatively coupled to the memory and to selectively execute the adaptive PSS system based upon a determination of whether the measured value of the operational parameter meets or exceeds a threshold value.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
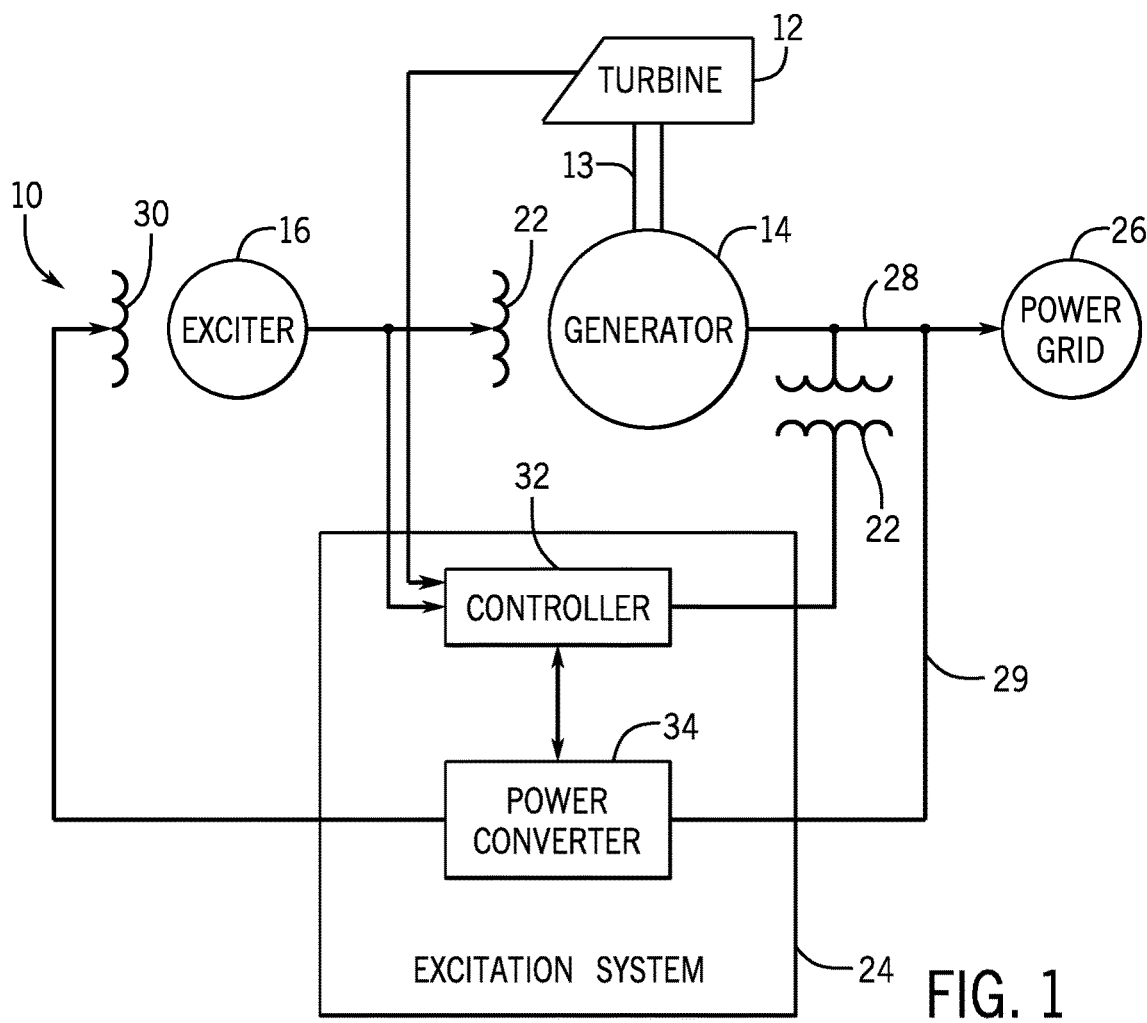
FIG. 1 is a block diagram of an embodiment of a turbine-generator system in accordance with present embodiments.

One or more specific embodiments of the invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the invention, the articles "a," "an," "the," and "said" are intended to mean that there are one or more of the elements. The terms "comprising," "including," and "having" are intended to be inclusive and mean that there may be additional elements other than the listed elements.

Present embodiments relate to systems and methods for dynamic control of damping of, for example, generator power angle oscillations. Particularly, an adaptive power system stabilizer (PSS) system is provided to continuously and adaptively determine whether to apply PSS settings values to dampen one of more of a variety of oscillation frequency ranges (e.g., inter-tie frequency range, local frequency range, intra-plant frequency range, and so forth) based upon detected frequency changes. For example, electricity generation due to renewable energy sources (e.g., wind, solar, and the like) can cause a power generation system lose inertia by affecting frequency changes in the grid (e.g., transient conditions). Thus, when sources of transient conditions cause particular transient changes (e.g., above a threshold value), less synchronous inertia is present and increased rate of change of frequency conditions may result.

In some cases, transients (transient conditions) that exceed one or more parameters (threshold values, such as frequency changes of a certain amount and/or frequency changes of a certain amount in a given period of time) may cause the PSS system, because of its inherent characteristics, to provide a synchronous generator voltage that deviates from nominal values. For example, if the PSS system is actively dampening transients of a particular type (e.g., transients that exceed a threshold value), the PSS system may induce voltage instability/overshoots at generator terminals, which may result in receiving end voltage to cross trip levels resulting in power system and/or grid voltage instability issues.

Accordingly, an excitation system that includes a PSS system may operate to dynamically detect transients, for example, in less than 500 ms, determine whether the transients exceed one or more threshold values, and block and/or alter one more functions of a PSS system and/or an automatic voltage regulator (AVR) (e.g., block execution of one or more control loops of the excitation system or alter the manner in which the PSS system and/or the AVR operates) when the one or more threshold values are exceeded. This may enhance the voltage stability of the power system to which the excitation system is connected. Thus, the excitation system operating with dynamic capabilities to execute, execute a modified version, or block one or more control operations based upon detected transients enhances the voltage stability of the power system it is connected to by, for example, maintaining a generator terminal voltage close to its nominal operational value. This may avoid the voltage instability/overshoots at the generator terminals of power system as well as, for example, avoid gas turbine shaft fatigues (and associated issues) otherwise caused due to sudden deviation of electromagnetic torque on shaft line.

As used herein, "power system stability" may refer at least to the ability of a power system and associated components (e.g., grid, generators, turbines, and so forth) to transition from, for example, a steady-state operating point (e.g., nominal operating point) to, for example, one or more other operating points (e.g., transient and/or dynamic operating points) following a perturbation, a disturbance, or other undesired impact to the power system. Furthermore, as used herein, "damp," "damping," and/or "damped oscillation" may refer to an act or result of a decreasing of amplitude of an oscillation with time. Similarly, "new operating parameter," "new state," or "new operating condition" may refer to the operating point and/or operating conditions the power system and associated components (e.g., grid, generators, turbines, and so forth) may periodically and/or aperiodically transition to during operation following, for example, the perturbation, the disturbance, or other undesired impact to the power system.

With the foregoing in mind, it may be useful to describe an embodiment of a power generating system, such as an example power generating system 10 illustrated in FIG. 1. The power generating system 10 may include various subsystems such as a turbine 12, a generator 14, and an exciter 16. The turbine 12 (e.g., gas turbine, steam turbine, hydro-turbine, and the like) may be coupled the generator 14 via a shaft 13. The generator 14 may be in turn communicatively coupled to the generator exciter 16. The exciter 16 may provide a direct current (DC) to field windings 22 of the generator 14. Particularly, the exciter 16 may provide a DC field current (e.g., the current utilized by the field windings 22 of the generator 14 and/or other synchronous machine to establish a magnetic field for operation) to excite the magnetic field of the generator 14. For example, the exciter 16 may be a static (e.g., power electronic) or rotating (e.g., brush and/or brushless) exciter. In other embodiments, the exciter 16 may be bypassed, and a power output may directly energize the field windings 22 of the generator 14. As also depicted, the output terminals of the generator 14 may be coupled to a large scale utility power grid 26 via alternating current (AC) lines 28. Alternatively, the output terminals of the generator 14 may be coupled to a small industrial power generation plant.

The power generating system 10 may also include an excitation system 24, which may provide various control parameters to each of the generator 14 and/or the exciter 16 for example, based on measured parameters and/or indications of measured parameters received at one or more inputs to the excitation system 24. In certain embodiments, the excitation system 24 may function as an excitation control for the generator 14 and the exciter 16. The excitation system 24 may include one or more controllers 32 and one or more power converters 34. The power converter 34 may include a subsystem of integrated power electronic switching devices such as silicon-controlled rectifiers (SCRs), thyristors, insulated gate bipolar transistors (IGBTs), and so forth, that receive alternating current (AC) power, DC power, or a combination thereof from a source such as, for example, the power grid 26. The excitation system 24 may receive this power via a bus 29, and may provide power, control, and monitoring to the field windings 30 of the exciter 16 based thereon. Thus, the excitation system 24 and the exciter 16 may operate collectively to drive the generator 14 in accordance with a desired output (e.g., grid voltage, power factor, loading frequency, torque, speed, acceleration, and so forth). As an example, in one embodiment, the excitation system 24 may be an excitation controller system, such as the EX2100e™ regulator, available from General Electric Co. of Schenectady, N.Y.

In certain embodiments, the power grid 26, and by extension, the turbine 12 and the generator 14 may be susceptible to certain disturbances due to, for example, transient loss of power generation by the generator 14, power line 28 switching, load changes on the power grid 26, electrical faults on the power grid 26, and so forth. Such disturbances may cause the operating frequencies (e.g., approximately 50 Hz for most countries of Europe and Asia and approximately 60 Hz for countries of North America) of the turbine 12 and/or the generator 14 to experience undesirable oscillations that may lead to system 10 transient and/or dynamic instability. Such transient and/or dynamic instability may cause the generator 14, as well as the turbine 12 and exciter 16, to transition from a steady-state operating point to a transient and/or dynamic operating point. Specifically, frequency deviations on the power grid 26 may cause generator 14 rotor angle swings (e.g., power angle oscillations) throughout the power system 10. Moreover, because conventional power system stabilizer (CPSS) systems (e.g., systems used to damp the generator 14 rotor angle oscillations) that may be generally configured according to linear, fixed parameters, the CPSS systems, unlike the PSS techniques described herein, may not damp the generator 14 rotor angle oscillations effectively over the entire dynamic operating range of the generator 14, as desired and may even create or increase instabilities. However, as additionally described herein, there may be situations in which blocking operation of a PSS system may also be desirable.

As will be discussed in further detail below, in certain embodiments, the controller 32 of the excitation system 24 may include an adaptive power system stabilizer (PSS) system 40 (shown in FIG. 2) that may be implemented as part of the excitation system 24 to dynamically and adaptively regulate (e.g., dynamically and adaptively damp) frequency oscillations of, for example, the rotor of the generator 14, and thus enhance the ability of the system 10 to seamlessly move to the transient and/or dynamic operating point or to substantially return to the steady-state operating point, or to survive the transition to a new steady-state operating point (e.g., derived by the adaptive PSS system 40) and to maintain stable operation at the new steady-state operating point.

Figure 2:
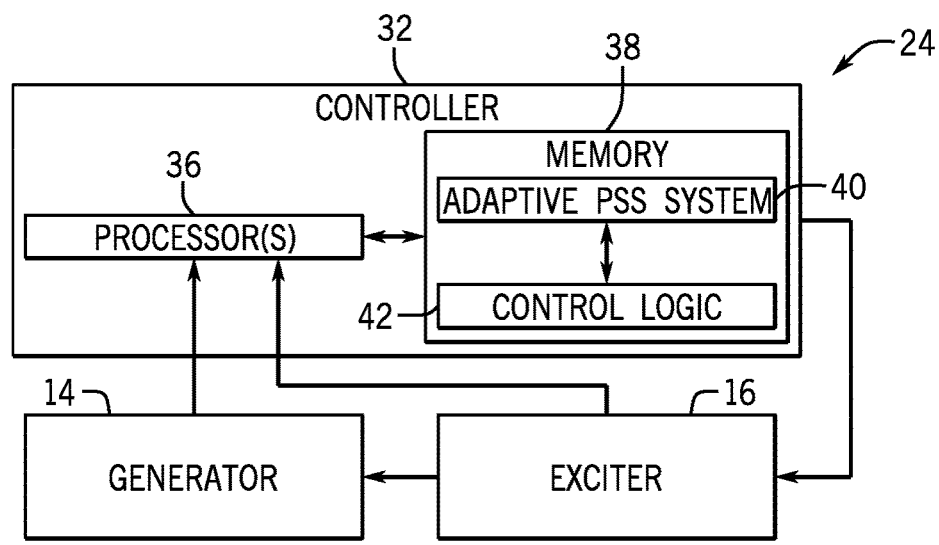
FIG. 2 is a schematic diagram of an embodiment of an excitation system included in the system of FIG. 1 including an adaptive power system stabilizer (PSS), in accordance with present embodiments.

Turning now to FIG. 2, the figure illustrates a detailed block diagram of an embodiment of the controller 32 included in the excitation system 24 (shown in FIG. 1). As generally illustrated, the controller 32 may include one or more processors 36 and a memory 38, which may be used collectively to support an operating system, software applications and systems, and so forth, useful in implementing the techniques described herein. Particularly, the controller 32 may include code or instructions stored in a non-transitory machine-readable medium (e.g., the memory 38 and/or other storage) and executed, for example, by the one or more processors 36 that may be included in the controller 32. The processor 36 may receive various operating state parameters (e.g., terminal voltage, real power (P), reactive power (Q), power factor, frequency, and so forth), which may be used by the adaptive PSS system 40 to derive and control (e.g., via the one or more processors 36) operating parameters of interest such as, for example, oscillations in real power (P) of the generator 14.

For example, as previously discussed above with respect to FIG. 1, under certain loading conditions (e.g., due to load demand changes on the power grid 26), the turbine 12, the generator 14, as well as other components that may be included within the power generating system 10 may be susceptible to transient and dynamic instability. In particular, system 10 frequency variations and/or changes in operating conditions may cause generator 14 rotor angle swings (e.g., oscillations). For example, the ranges of frequencies may include low frequency inter-tie mode frequencies (e.g., approximately 0.1-1.0 Hz), local mode frequencies (e.g., approximately 1-2.0 Hz), and intra-plant mode frequencies (e.g., approximately 2.0-3.0 Hz). Accordingly, the adaptive PSS system 40 (e.g., executed via the one or more processors 36) may be used to add damping (e.g., attenuation of the amplitude of the generator 14 rotor angle oscillations with time) to the generator 14 rotor angle oscillations by controlling generator 14 excitation.

In certain embodiments, the adaptive PSS system 40 may be a software system, or in other embodiments, a combination of software and hardware that may be used to generate appropriate operating state parameters of the generator 14 based on, for example, real power (P) (e.g., MW), reactive power (Q) (e.g., kVar), power factor, frequency, terminal voltage), and so forth. The adaptive PSS system 40 may thus damp the generator 14 rotor angle oscillations over a broad range of frequencies. In certain embodiments, the adaptive PSS system 40 may derive PSS settings for each frequency sub range of a set of partitioned operating frequency ranges of the generator 14. Specifically, the adaptive PSS system 40 may derive a set of specific linearized models of the system (e.g., based on real power (P), reactive power (Q), apparent power (S), power factor, frequency, terminal voltage, and so forth) such that the new PSS controller with optimized settings 32 may damp generator 14 rotor angle oscillations over, for example, each of the inter-tie oscillation frequency range (e.g., approximately 0.1-1.0 Hz), local oscillation frequency range (e.g., approximately 1.0-2.0 Hz), and intra-plant oscillation frequency range (e.g., approximately 2.0-3.0 Hz), and so forth.

In some embodiments, the adaptive PSS system 40 may derive specific PSS settings for each of any number of partitioned operating frequency ranges of the generator 14. For example, instead of, or in addition to the inter-tie oscillation, local oscillation, and intra-plant oscillation frequency ranges, the adaptive PSS system 40 may derive specific PSS settings for frequency ranges partitioned according to 0.5 Hz sub ranges (e.g., 0.1-0.5 Hz, 0.5-1.0 Hz, 1.0-1.5 Hz, 1.5-2.0 Hz, and so on), 0.2 Hz sub ranges (e.g., 0.2-0.4 Hz, 0.4-0.6 Hz, 0.6-0.8 Hz, 0.8-1.0 Hz, and so on), 0.1 Hz sub ranges (e.g., 0.1-0.2 Hz, 0.2-0.3 Hz, 0.3-0.4 Hz, 0.4-0.5 Hz, and so on), and/or according to some other user-configurable or application-specific frequency sub range.

In other embodiments, the adaptive PSS system 40 may derive multiple sets of specific PSS settings for overlapping partitioned frequency sub ranges (e.g., a set of PSS settings for frequency sub ranges of 1.0-2.0 Hz and different set of PSS settings for frequency sub ranges of 0.5-1.0 Hz and 1.0-2.0 Hz), and may contrive a determination as to which set of PSS settings may be most suitable (e.g., most closely match) for the given operating conditions of the system 10, for example. In these manners, the adaptive PSS system 40 (e.g., executed via the processor 36) may individually derive PSS settings for each possible oscillation frequency range (e.g., inter-tie frequency sub range, local frequency sub range, intra-plant frequency sub range, and/or other user-configurable frequency sub ranges), and apply the appropriate PSS settings based on, for example, the current operating conditions. Thus, the adaptive PSS system 40 may derive settings to adaptively damp generator 14 rotor angle oscillations over the entire operating output curve of the generator 14, and may thus provide for faster and substantially seamless response to transient and/or dynamic instability of the generator 14 and/or turbine 12, and by extension, the system 10.

In certain embodiments, the adaptive PSS system 40 (e.g., executed via the processor 36) may generate the suitable PSS settings by deriving specific PSS settings that are part of a training data set derived for specific turbine 12 and/or generator 14 operating conditions (e.g., based on whether the turbine 12 and/or generator 14 are operating at base load levels of 70-80% rating, peak load levels of 90-100% rating, and so forth). Particularly, the adaptive PSS system 40 of the controller 32 may iteratively derive a set of rules based on, for example, field voltage and current (e.g., voltage and current on the field windings 22 of the generator 14), real power (P), reactive power (Q), and terminal voltage that may be defined to identify the PSS settings that are most appropriate for the specific operating conditions of the turbine 12 and/or the generator 14 and/or turbine 12. For example, the adaptive PSS system 40 may implement techniques such as statistical methods (e.g., linear regression, non-linear regression, data mining) and artificial intelligence or machine learning models (e.g., neural networks, expert systems, support vector machines (SVMs), logic reasoning systems) that may be used to analyze the training data sets and to construct a knowledgebase of suitable PSS settings to respond to new dynamic operating conditions.

In certain embodiments, the PSS settings derived by the adaptive PSS system 40 may be dynamically updated (e.g., in real-time or near real-time) to further improve control and damping of the exciter 16, and by extension, the rotor angle swings of the generator 14. For example, as further illustrated in FIG. 2, the adaptive PSS system 40 may interface with control logic system 42. In one embodiment, the adaptive PSS system 40 may be a fuzzy logic controller (FLC) (e.g., or other artificial intelligence-based controller), which may be a rule-based system (e.g., fuzzy rules and/or expert system rules) used to select and determine the most suitable PSS settings for each possible generator 14 operating parameter (e.g., terminal voltage and current, speed and acceleration, and so forth) of the PSS settings derived, for example, by the adaptive PSS system 40 as part of training data set of operating parameters. It is to be understood that while the logic control system 42 may include fuzzy logic-based techniques, the adaptive PSS system 40 may include, additionally or alternatively, other techniques including forward or backward chained expert systems, data mining techniques (e.g., clustering, classification), logic programming techniques (e.g., Prolog, Datalog), neural network techniques, and the like.

In certain embodiments, as previously noted, the adaptive PSS system 40 may utilize fuzzy logic (and/or other intelligence models) to adapt to the current power grid 26 conditions. In one embodiment, the adaptive PSS system 40 may further include one or more input filters (e.g., Butterworth filters, RLS filters, LMS filters, Kalman filters, Chebyshev filters, and/or similar filters) on the state variable inputs (e.g., inputs corresponding to real power (P), reactive power (Q), terminal voltage, and so forth) to the adaptive PSS system 40 to render the adaptive PSS system 40 substantially immune to transient electrical faults that may occur on the power grid 26. Specifically, by using the input filters, the adaptive PSS system 40 may attenuate and/or filter any fluctuations in the state input variables resulting from, for example, electrical faults on the power grid 26. Thus, the adaptive PSS system 40 may be responsive to actual and/or persistent variations in the operating state of the generator 14. In some embodiments, the adaptive PSS system 40 may map a set of input parameters (e.g., real power P, reactive power Q, generator 14 terminal voltage, and so forth) that define the operating state of the generator 14 to an optimal (e.g., most suitable) set of output parameters. The set of output parameters may include, for example, PSS lead, lag, and gain constants, which may be specifically and automatically tuned to the particular operating state of the generator 14.

For example, in certain embodiments, the inputs to the adaptive PSS system 40 may be fuzzy linguistic variables. Specifically, the crisp, or absolute value of the fuzzy linguistic variable may be assigned a degree of "truth" in each of several input membership functions by the adaptive PSS system 40. Similarly, the rules may include a set of if-then statements that take the degree of "truth" the fuzzy linguistic variable includes as an input membership function, and may assign that degree of "truth" to the corresponding output membership function. The adaptive PSS system 40 may then defuzzify the resolution of the activated output membership functions into one crisp, or absolute value for the output of the adaptive PSS system 40. This resolution may be accomplished by the adaptive PSS system 40 calculating the weighted average of the values of the output membership functions, in which the weights may be the respective degree of "truth" in those output membership functions.

In certain embodiments, the adaptive PSS system 40 along with the control logic 42 of the controller 32 may continuously and adaptively derive PSS settings values for each possible oscillation frequency range (e.g., inter-tie frequency range, local frequency range, intra-plant frequency range, and so forth) of the generator 14 and/or the turbine 12, as well as continuously update the training data sets via the control logic 42. In other words, the adaptive PSS system 40 may "learn" during actual operations, and thus be customized with minimum effort to a specific installation. In this way, the adaptive PSS system 40 in conjunction with the control logic 42 may provide training set of data values for oscillation frequency range (e.g., inter-tie frequency range, local frequency range, intra-plant frequency range, and so forth) and damp generator 14 rotor angle oscillations over the entire generator 14 operating and/or output curve.

In some situations, the use of the adaptive PSS system 40 in response to certain detected transients may cause undesirable results. For example, transients (transient conditions) that exceed one or more parameters (threshold values, such as frequency changes of a certain amount and/or frequency changes of a certain amount in a given period of time) may cause the adaptive PSS system 40 to provide a voltage that deviates from nominal values. For example, if the adaptive PSS system 40 is actively dampening transients of a particular type (e.g., transients that exceed a threshold value), the adaptive PSS system 40 may induce voltage instability/overshoots at terminals of the generator 14 that may be eliminated and/or reduced if, instead, the adaptive PSS system 40 is blocked from operation or if the operation of the adaptive PSS system 40 is modified.

Accordingly, the excitation system 24 and, more particularly, the one or more processors 36 and memory 38 of the controller 32, may be used collectively to implementing the techniques described herein. Particularly, the controller 32 may include code or instructions stored in a non-transitory machine-readable medium (e.g., the memory 38 and/or other storage) and executed, for example, by the one or more processors 36 to receive and monitor various operating state parameters (e.g., terminal voltage, real power (P), reactive power (Q), power factor, frequency, and so forth) to detect whether the parameters exceed one or more threshold (e.g., preset values) and, when exceeded, the controller may operate to alter (e.g., block, deactivate, or otherwise prevent the adaptive PSS system 40 from dampening one more outputs and/or operational characteristics of the generator 14 or modify the operation of the adaptive PSS system 40).

In some embodiments, the excitation system 24 dynamically detects the occurrence of a transient in less than a predetermined time. This predetermined time may be less than and/or equal to approximately 1 second, 900 ms, 800 ms, 700 ms, 600 ms, 500 ms, 400 ms, 300 ms, 200 ms or another time period. This predetermined time may be between approximately 100 ms and 700 ms, 200 ms and 600 ms, 300 ms and 500 ms, or another time period. Once transients that exceed the predetermined threshold are detected and the operation of the adaptive PSS system 40 is altered (e.g., modified and/or blocked), the excitation system 24 may reinitiate monitoring of transient conditions for determination of whether to utilize the adaptive PSS system 40 in response to the detected transient condition.

Figure 3:
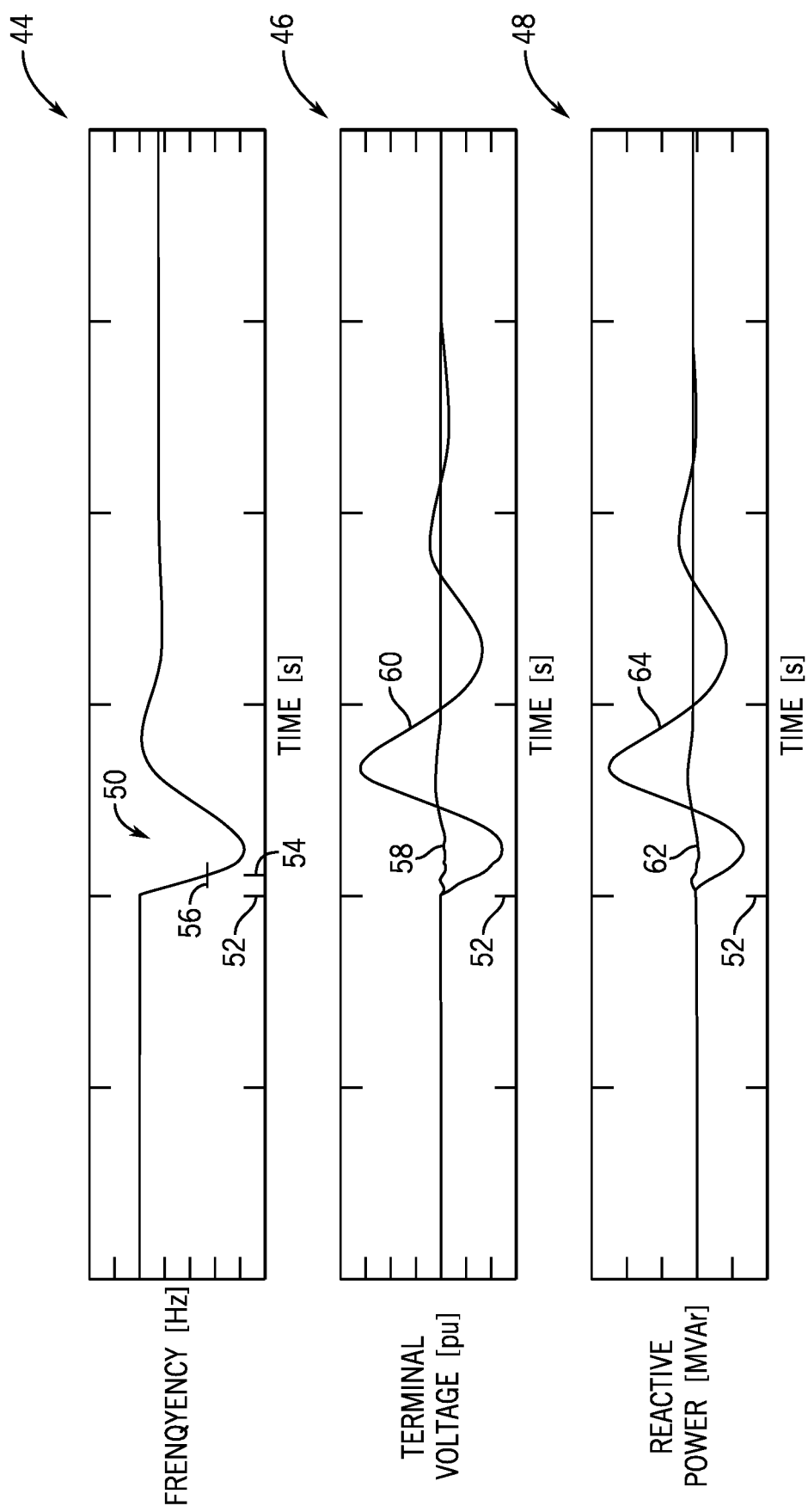
FIG. 3 is a plot diagram illustrating dampening effects by the adaptive PSS system of FIG. 2, in accordance with present embodiments.

FIG. 3 displays plot diagrams 44, 46, and 48 illustrating a transient condition 50 and the resultant operation of the excitation system 24 when allowing and altering (e.g., blocking or disabling) operation of the adaptive PSS system 40. Although blocking of the operation of the adaptive PSS system 40 is described below, it should be noted that the illustrated techniques may also be applied to modify the operation of the adaptive PSS system 40 (e.g., to alter one or more input values to the adaptive PSS system 40 so as to modify the output of the adaptive PSS system 40). As illustrated in diagram 44, the transient condition 50 may occur (beginning at a first time 52) that can impact the operation of the power generating system 10 and, thus, performance of the power grid 26. This transient condition 50 may be detected by the adaptive PSS system 40 and/or the adaptive PSS system 40 may be continuous monitoring for the transient condition 50.

At time 54, the controller 32 may include code or instructions stored in a non-transitory machine-readable medium (e.g., the memory 38 and/or other storage) and executed, for example, by the one or more processors 36 may determine an operating state parameter (e.g., a frequency value or a frequency difference) and may compare the operating state parameter against a threshold value 56. This determination may be made at a set time (e.g., at time 54) subsequent to the first time 52. Additionally and/or alternatively, the threshold determination (e.g., whether the operating state parameter has exceed the threshold value 56) may be made by tracking the change in at least one operating state parameter and comparing the change against the threshold value 56. This determination of whether the threshold value 56 has been exceeded prior to and/or or by time 54.

As illustrated in plot diagram 46, the controller 32 operating to alter (e.g., block) operation of the adaptive PSS system 40 in response to the threshold value 56 being met and/or exceeded may reduce adaptive PSS system 40 induced voltage instability/overshoots at terminals of the generator 14. For example, graph 58 illustrates a terminal voltage of generator 14 with the adaptive PSS system 40 having been blocked (e.g., disabled) when the threshold value 56 is determined to be met and/or exceeded. Conversely, graph 60 illustrates a terminal voltage of generator 14 with the adaptive PSS system 40 not having been blocked (e.g., disabled) when the threshold value 56 is determined to be met and/or exceeded (e.g., if the adaptive PSS system 40 is allowed to operate freely without constraint). As illustrated, allowing the adaptive PSS system 40 to operate when threshold value 56 has been met and/or exceeded may cause additional fluctuations (e.g., in amount and/or in duration) of the terminal voltage of generator 14 relative to disabling of the adaptive PSS system 40 when a condition (e.g., threshold value 56) is met and/or exceeded.

Similarly, as illustrated in plot diagram 48, the controller 32 operating to disable (e.g., block) operation of the adaptive PSS system 40 in response to the threshold value 56 being met and/or exceeded may reduce adaptive PSS system 40 induced reactive power (Q) instability/overshoots of, for example, the generator 14. For example, graph 62 illustrates reactive power (Q) of generator 14 with the adaptive PSS system 40 having been blocked (e.g., disabled) when the threshold value 56 is determined to be met and/or exceeded. Conversely, graph 64 illustrates reactive power (Q) of generator 14 with the adaptive PSS system 40 not having been blocked (e.g., disabled) when the threshold value 56 is determined to be met and/or exceeded (e.g., if the adaptive PSS system 40 is allowed to operate freely without constraint). As illustrated, allowing the adaptive PSS system 40 to operate when threshold value 56 has been and/or exceeded may cause additional fluctuations (e.g., in amount and/or in duration) of the reactive power (Q) of generator 14 relative to disabling of the adaptive PSS system 40 when a condition (e.g., threshold value 56) is met and/or exceeded. In this manner, the controller 32 may determine situations in which the adaptive PSS system 40 is selectively applied and/or disabled in response to conditions, such as transient condition 50.

Figure 4:
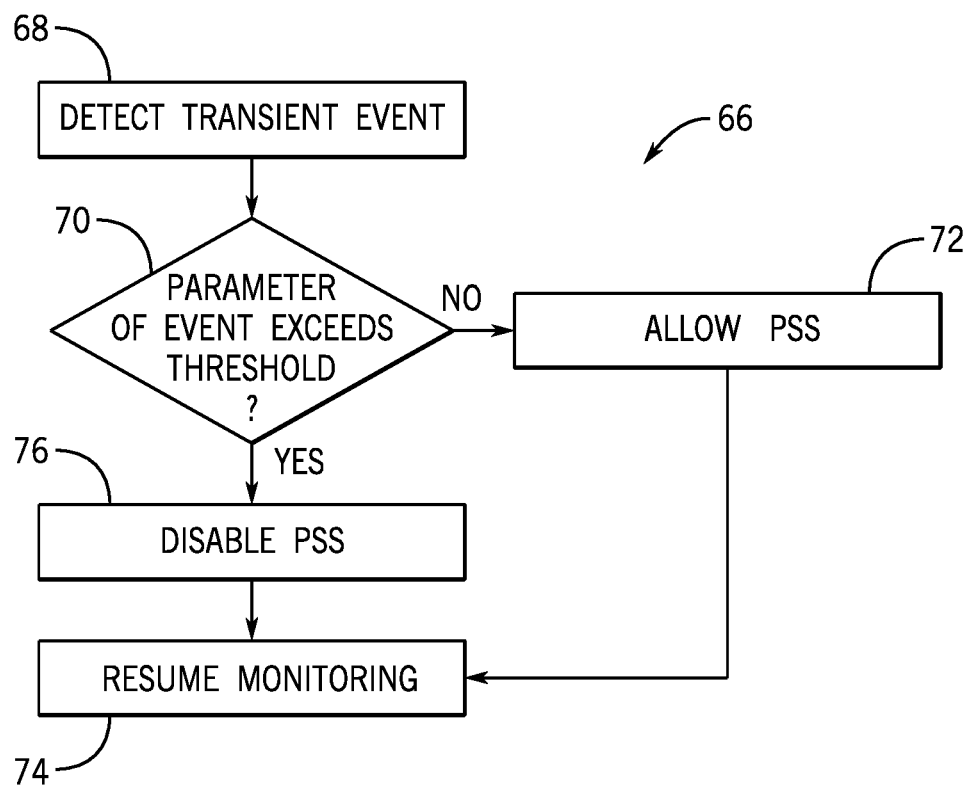
FIG. 4 is a flowchart illustrating an embodiment of a process suitable for adaptive control of damping via the PSS system of FIG. 2, in accordance with present embodiments.

A flow chart 66 illustrative of the operation of the excitation system 24 described above is set forth in FIG. 4. In step 68, detection of a transient event, such as transient condition 50, may be accomplished via, for example, the excitation system 24. Detection of the transient event may lead to step 70, in which the excitation system 24 (e.g., the controller 32) may determine if one or more of the monitored operating state parameters (e.g., terminal voltage, real power (P), reactive power (Q), power factor, frequency, and so forth) exceed one or more corresponding thresholds (e.g., preset values), such as threshold value 56.

In step 70, if and/or when no operating state parameter is determined to have exceed one or more corresponding thresholds (e.g., preset values), such as threshold value 56, the adaptive PSS system 40 (e.g., implemented as part of the excitation system 24 to dynamically and adaptively regulate, e.g., dynamically and/or adaptively damp frequency oscillations of the rotor of the generator 14, to enhance the ability of the system 10 to seamlessly move to the transient and/or dynamic operating point, to substantially return to the steady-state operating point and/or to survive the transition to a new steady-state operating point, e.g., derived by the adaptive PSS system 40, and/or to maintain stable operation at the new steady-state operating point) may continue operation (step 72). This operation may include, for example, the adaptive PSS system 40, along with the control logic 42 of the controller 32, continuously and adaptively deriving PSS settings values for each possible oscillation frequency range (e.g., inter-tie frequency range, local frequency range, intra-plant frequency range, and so forth) of the generator 14 and/or the turbine 12, as well as continuously update the training data sets via the control logic 42.

Once the adaptive PSS system 40 has mitigated the detected transient event that did not include one or more operating state parameters that exceeded one or more corresponding thresholds (e.g., preset values) in step 72, monitoring for transient events may be resumed (step 74) subsequent to a predetermined amount of time, subsequent to measurements of an operating state parameter at a particular level being recognized, or the like, such that continued monitoring may be accomplished. This monitoring may continue, for example, until such time as another transient event is detected (step 68), at which time, the process illustrated in flow chart 66 may be repeated.

Additionally, in step 70, if and/or when an operating state parameter is determined to have met and/or exceed one or more corresponding thresholds, such as threshold value 56, the adaptive PSS system 40 may be disabled in step 76, for example, via the controller 32, to block (e.g., prevent) operation of the adaptive PSS system 40. Once the adaptive PSS system 40 has been disabled for a predetermined amount of time, once measurements of an operating state parameter at a particular level have been recognized, or the like, continued monitoring for transient events may be resumed (step 74). This monitoring may continue, for example, until such time as another transient event is detected (step 68), at which time, the process illustrated in flow chart 66 may be repeated.

Figure 5:
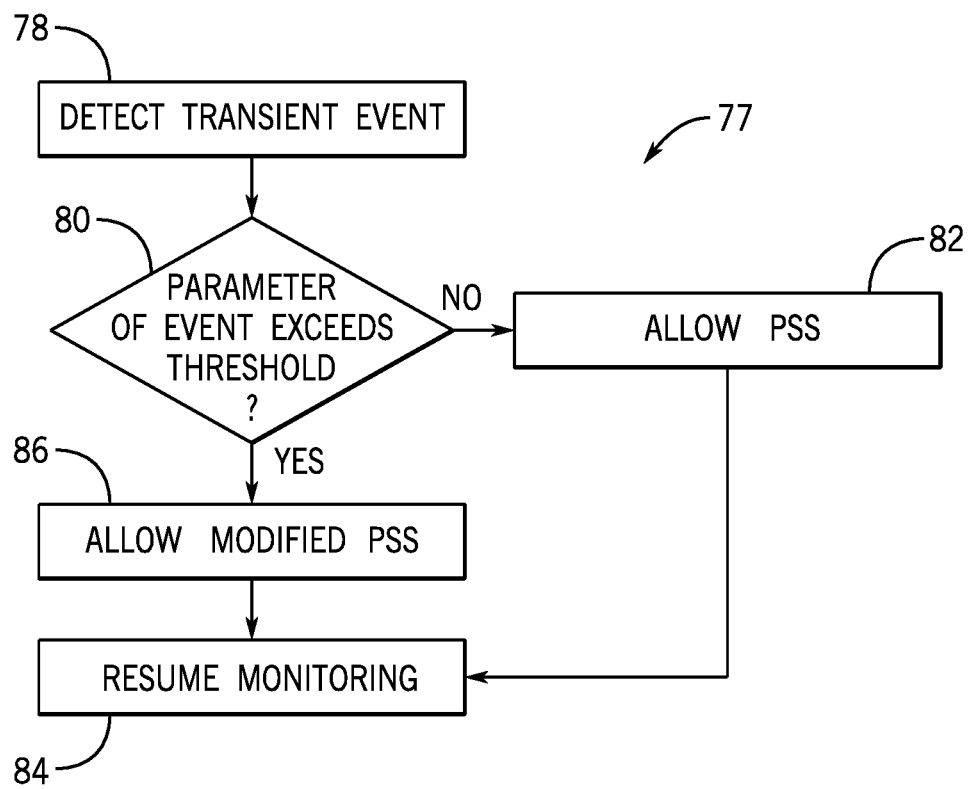
FIG. 5 is a flowchart illustrating a second embodiment of a process suitable for adaptive control of damping via the PSS system of FIG. 2, in accordance with present embodiments.

In some embodiments, disabling of the adaptive PSS system 40 in step 76 in response to the detection of the transient condition 50 may still induce unwanted and/or undesirable signals into a power grid 26. Accordingly, as illustrated in FIG. 5, modification of the operation of the adaptive PSS system 40 may be undertaken in place of disabling of the adaptive PSS system 40. In diagram 44, the transient condition 50 may occur (beginning at a first time 52) that can impact the operation of the power generating system 10 and, thus, performance of the power grid 26. This transient condition 50 may be detected by the adaptive PSS system 40 and/or the adaptive PSS system 40 may be continuous monitoring for the transient condition 50.

A flow chart 77 illustrative of the operation of the excitation system 24 described above is set forth in FIG. 5. In step 78, detection of a transient event, such as transient condition 50, may be accomplished via, for example, the excitation system 24. Detection of the transient event may lead to step 80, in which the excitation system 24 (e.g., the controller 32) may determine if one or more of the monitored operating state parameters (e.g., terminal voltage, real power (P), reactive power (Q), power factor, frequency, and so forth) exceed one or more corresponding thresholds (e.g., preset values), such as threshold value 56.

In step 80, if and/or when no operating state parameter is determined to have exceed one or more corresponding thresholds (e.g., preset values), such as threshold value 56, the adaptive PSS system 40 (e.g., implemented as part of the excitation system 24 to dynamically and adaptively regulate, e.g., dynamically and/or adaptively damp frequency oscillations of the rotor of the generator 14, to enhance the ability of the system 10 to seamlessly move to the transient and/or dynamic operating point, to substantially return to the steady-state operating point and/or to survive the transition to a new steady-state operating point, e.g., derived by the adaptive PSS system 40, and/or to maintain stable operation at the new steady-state operating point) may continue operation (step 82). This operation may include, for example, the adaptive PSS system 40, along with the control logic 42 of the controller 32, continuously and adaptively deriving PSS settings values for each possible oscillation frequency range (e.g., inter-tie frequency range, local frequency range, intra-plant frequency range, and so forth) of the generator 14 and/or the turbine 12, as well as continuously update the training data sets via the control logic 42.

Once the adaptive PSS system 40 has mitigated the detected transient event that did not include one or more operating state parameters that exceeded one or more corresponding thresholds (e.g., preset values) in step 82, monitoring for transient events may be resumed (step 84) subsequent to a predetermined amount of time, subsequent to measurements of an operating state parameter at a particular level being recognized, or the like, such that continued monitoring may be accomplished. This monitoring may continue, for example, until such time as another transient event is detected (step 78), at which time, the process illustrated in flow chart 76 may be repeated.

Additionally, in step 80, if and/or when an operating state parameter is determined to have met and/or exceed one or more corresponding thresholds, such as threshold value 56, the adaptive PSS system 40 may be modified in step 86, for example, via the controller 32, to alter operation of the adaptive PSS system 40. This modification may include alteration of one or more input values (e.g., generator speed or other generator values) to a predetermined or preset level or may include selection of one or more predetermined or preset modified (e.g., synthesized) input values to the adaptive PSS system 40 to alter the output of the adaptive PSS system 40. In some embodiments, these one or more input values may be altered in conjunction with a preset (e.g., predetermined) manner such that the modified input value is set to a constant or preset value. In some embodiments, the alteration of the one or more input values for a given threshold may correspond to the transient condition 50 and/or the one or more threshold values in step 80 such that the modified input value is tailored (e.g., selected in a predetermined manner) to dampen the transient condition 50. Likewise, if in place of modification of one or more input values, selection of one or more preset (e.g., predetermined) modified (e.g., synthesized) input values to the adaptive PSS system 40 is undertaken to alter the output of the adaptive PSS system 40, the one or more one or more preset modified input values may correspond to the transient condition 50 and/or the one or more threshold values in step 80 such that the selected preset modified input value is tailored (e.g., selected in a predetermined manner) to dampen the transient condition 50.

In this manner, the modified output of the adaptive PSS system 40 may be attributable to the altered input value to the adaptive PSS system 40 such that the input value may be chosen to have a desirable change to the output of the adaptive PSS system 40. Thus, the adaptive PSS system 40 response may be tailored to the transient condition 50 detected. Additionally, in some embodiments, the alteration of the output of the adaptive PSS system 40 (e.g., through alteration of one or more input signals to the adaptive PSS system 40) may be continued for a predetermined amount of time, for example, once measurements of an operating state parameter at a particular level have been recognized, or the like. Subsequently, continued monitoring for transient events may be resumed (step 84). This monitoring may continue, for example, until such time as another transient event is detected (step 78), at which time, the process illustrated in flow chart 76 may be repeated.

Additionally, in some embodiments, dependent on the transient condition 50 and/or the threshold value exceed, the decision in step 80 may include a third outcome whereby the adaptive PSS system 40 is blocked (similar to step 76 of FIG. 4 described above) followed by subsequent continued monitoring for transient events being resumed (step 84). In this manner, multiple outcomes may be undertaken, for example, in response to a particular transient condition 50 and/or the one or more threshold values of step 80 so that the response may best be tailored to best (e.g., most effectively, most efficiently, most quickly, or the like) dampen resultant oscillations due to a transient condition 50.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
an excitation system, comprising:
a memory configured to store an adaptive power system stabilizer (PSS) system configured to dynamically stabilize an operation of a generator system; and
a processor communicatively coupled to the memory and configured to selectively utilize the adaptive PSS system based upon a determination of whether one or more operational parameters of the generator system has met or exceeded a threshold value, wherein the processor of the excitation system is configured to deactivate the adaptive PSS system when the determination indicates that the one or more operational parameters of the generator system has met or exceeded the threshold value, wherein the one or more operational parameters of the generator system comprise a frequency difference and to reactivate and control the adaptive PSS system when the adaptive PSS system is activated.

2. The system of claim 1, wherein the processor is configured to utilize the adaptive PSS system to derive a value for the one or more operational parameters of the generator system, wherein the derived value is configured to attenuate an oscillation of a power angle over at least one of a plurality of interval operating frequency ranges of the generator system.

3. The system of claim 2, wherein the processor is configured to apply the derived value to the one or more operational parameters based at least in part on which of the plurality of interval operating frequency ranges the oscillation most closely corresponds to.

4. The system of claim 1, wherein the processor is configured to initiate monitoring of a transient event upon expiration of a period of time subsequent to deactivation of the adaptive PSS system.

5. The system of claim 1, wherein the processor is configured to initiate monitoring of a transient event upon a determination that the one or more operational parameters correspond to a predetermined level subsequent to deactivation of the adaptive PSS system.

6. The system of claim 1, wherein the processor is configured utilize the adaptive PSS system when the determination indicates that the one or more operational parameters of the generator system has not met or exceeded the threshold value to dampen at least one output of the generator system.

7. The system of claim 6, wherein the processor is configured to initiate monitoring of a transient event upon expiration of a period of time subsequent to utilization of the adaptive PSS system.

8. The system of claim 6, wherein the processor is configured to initiate monitoring of a transient event upon a determination that the one or more operational parameters correspond to a predetermined level subsequent to utilization of the adaptive PSS system.

9. The system of claim 1, wherein the processor is configured to utilize the adaptive PSS system to generate a training set of data.

10. The system of claim 1, wherein the processor is configured to selectively utilize the adaptive PSS system through alteration of at least one input value to be transmitted to the adaptive PSS system resulting in at least one preset modified input value to be transmitted to the adaptive PSS system in place of the at least one input value based upon the determination of whether one or more operational parameters of the generator system has met or exceeded the threshold value.

11. A non-transitory computer-readable medium having computer executable code stored thereon, the code comprising instructions to:
dynamically stabilize an operation of a generator system via selectively utilizing an adaptive PSS system based upon a determination of whether one or more operational parameters of the generator system has met or exceeded a threshold value, wherein the code comprises instructions to deactivate the adaptive PSS system when the determination indicates that the one or more operational parameters of the generator system has met or exceeded the threshold value, wherein the one or more operational parameters of the generator system comprise frequency difference, and wherein the adaptive PSS system is deactivated via a power system stabilizer that is configured to reactivate and control the adaptive PSS system when the adaptive PSS system is activated.

12. The non-transitory computer-readable medium of claim 11, wherein the one or more operational parameters of the generator system comprise a frequency value, a frequency difference, or a combination thereof.

13. The non-transitory computer-readable medium of claim 12, wherein the code comprises instructions to initiate monitoring of a transient event upon expiration of a period of time subsequent to deactivation of the adaptive PSS system.

14. The non-transitory computer-readable medium of claim 12, wherein the code comprises instructions to initiate monitoring of a transient event upon a determination that the one or more operational parameters correspond to a predetermined level subsequent to deactivation of the adaptive PSS system.

15. The non-transitory computer-readable medium of claim 11, wherein the code comprises instructions to utilize the adaptive PSS system when the determination indicates that the one or more operational parameters of the generator system has not met or exceeded the threshold value to dampen at least one output of the generator system.

16. The non-transitory computer-readable medium of claim 11, wherein the code comprises instructions to alter at of at least one input value to be transmitted to the adaptive PSS system resulting in at least one preset modified input value to be transmitted to the adaptive PSS system in place of the at least one input value based upon the determination of whether one or more operational parameters of the generator system has met or exceeded the threshold value.

17. A system, comprising:
an excitation system configured to regulate one or more outputs of a power generating system, comprising:
a memory configured to store an adaptive power system stabilizer (PSS) system configured to dynamically stabilize an operation of the power generating system;
an input configured to receive an indication of a measured value of an operational parameter of the generator system; and
a processor communicatively coupled to the memory and configured to selectively execute the adaptive PSS system based upon a determination of whether the measured value of the operational parameter meets or exceeds a threshold value, wherein the processor of the excitation system is configured to prevent execution of the adaptive PSS system when the determination indicates that the measured value of the operational parameter meets or exceeds the threshold value, wherein the one or more operational parameters of the generator system comprise a frequency difference and to reactivate and control the adaptive PSS system when the adaptive PSS system is activated.

18. The system of claim 17, wherein the processor is configured to facilitate execution of the adaptive PSS system with a preset modified input value to be transmitted to the adaptive PSS system in place of an input value to the adaptive PSS when the determination indicates that the measured value of the operational parameter meets or exceeds the threshold value.

* * * * *